United States Patent
Xu et al.

(10) Patent No.: US 11,910,443 B2
(45) Date of Patent: Feb. 20, 2024

(54) PRACH DETECTION METHOD AND APPARATUS

(71) Applicant: HUAWEI TECHNOLOGIES CO., LTD., Shenzhen (CN)

(72) Inventors: Heng Xu, Shanghai (CN); Jian Li, Shanghai (CN); Mingtao Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/349,160

(22) Filed: Jun. 16, 2021

(65) Prior Publication Data
US 2021/0315022 A1    Oct. 7, 2021

Related U.S. Application Data

(63) Continuation of application No. PCT/CN2019/125913, filed on Dec. 17, 2019.

(30) Foreign Application Priority Data

Dec. 17, 2018   (CN) ...................... 201811544241.7

(51) Int. Cl.
  *H04W 74/08*   (2009.01)
  *H04W 72/04*   (2023.01)
  (Continued)

(52) U.S. Cl.
  CPC ....... *H04W 74/0833* (2013.01); *H04W 16/28* (2013.01); *H04W 72/044* (2013.01); *H04B 7/0413* (2013.01); *H04W 84/042* (2013.01)

(58) Field of Classification Search
  CPC ............. H04W 74/0833; H04W 16/28; H04W 72/046; H04B 7/0695; H04B 17/318
  See application file for complete search history.

(56) References Cited

U.S. PATENT DOCUMENTS

| 2017/0019928 A1* | 1/2017 | Viraraghavan | ..... H04L 27/2636 |
| 2019/0223102 A1* | 7/2019 | Murali | .............. H04W 52/0229 |

(Continued)

FOREIGN PATENT DOCUMENTS

| CA | 3015048 A1 | 8/2017 |
| CN | 101686547 A | 3/2010 |

(Continued)

OTHER PUBLICATIONS

Huawei et al: "Uplink TA maintenance with multi-beam operation", 3GPP Draft; R2-1801044,Jan. 12, 2018, XP051386540, total 3 pages.

(Continued)

*Primary Examiner* — Minjung Kim
(74) *Attorney, Agent, or Firm* — Rimon PC

(57) ABSTRACT

Embodiments of this application relate to a PRACH detection method, and the method includes: sequentially detecting frequency domain data of each beam in at least two groups of beams; obtaining frequency domain data of a frequency corresponding to a PRACH from frequency domain data of a currently detected beam; determining a time domain correlation peak of the PRACH based on the frequency domain data of the frequency corresponding to the PRACH; determining a first peak value based on the time domain correlation peak of the PRACH; and when the first peak value is greater than or equal to a first threshold, sending a random access response message to user equipment.

16 Claims, 4 Drawing Sheets

(51) Int. Cl.
*H04W 16/28* (2009.01)
*H04W 72/044* (2023.01)
*H04B 7/0413* (2017.01)
*H04W 84/04* (2009.01)

(56) References Cited

U.S. PATENT DOCUMENTS

2020/0187259 A1* 6/2020 Liu .................. H04B 7/088
2023/0269603 A1* 8/2023 Lee .................. H04B 7/088
370/329

FOREIGN PATENT DOCUMENTS

| CN | 102869027 A | 1/2013 |
| CN | 103384378 A | 11/2013 |
| CN | 105589506 A | 5/2016 |
| CN | 107223361 A | 9/2017 |
| CN | 107889156 A | 4/2018 |
| CN | 108811119 A | 11/2018 |
| EP | 3048852 A2 | 7/2016 |
| WO | 2018049274 A1 | 3/2018 |

OTHER PUBLICATIONS

Huawei, HiSilicon, UL beam management. 3GPP TSG RAN WG1 Meeting #89, Hangzhou, China, May 15, 19 2017, R1-1706925, 6 pages.

Ericsson, PRACH improvements for network robustness. 3GPP TSG-RAN WG1 Meeting #95, Spokane, US, Nov. 12, 16, 2018, R1-1813172, 8 pages.

* cited by examiner

PRACH DETECTION METHOD AND APPARATUS

CROSS-REFERENCE TO RELATED APPLICATIONS

This application is a continuation of International Application No. PCT/CN2019/125913, filed on Dec. 17, 2019, which claims priority to Chinese Patent Application No. 201811544241.7, filed on Dec. 17, 2018. The disclosures of the aforementioned applications are hereby incorporated by reference in their entireties.

TECHNICAL FIELD

This application relates to the communications field, and in particular, to a PRACH detection method and an apparatus that are based on hierarchical beam scanning.

BACKGROUND

With the development of a 5th generation mobile communications (5G) technology, the International Telecommunication Union-Radio Communications Sector (ITU-R) has determined three major application scenarios of 5G, including enhanced mobile broadband (eMBB), ultra-reliable and low-latency communication (URLLC), and massive machine-type communication (mMTC). In addition, the foregoing three application scenarios also correspondingly impose a higher requirement on an access latency of user equipment (UE).

In a 5G wireless communications system, a gNodeB implements access of UE in a random access manner, to obtain a corresponding UE identifier (ID), and implement uplink time synchronization of the UE. Physical random access channel (PRACH) detection is the first step in a process of implementing the access. In the PRACH detection, a round-trip propagation latency of the UE that has performed access is estimated by detecting a preamble. The gNodeB determines, by detecting a preamble sent by the UE, whether there is a random access request initiated by the UE in a preamble subframe, and determines specific UE corresponds to a preamble that is currently used to initiate the random access request. To implement control over the uplink time synchronization of the UE and power of a random access channel (RACH), a physical layer measures a detected preamble, including measuring an uplink time offset measurement, interference noise power of the RACH, and received power strength of the RACH channel, and finally reports a measurement result to a higher layer.

Currently, a massive MIMO technology is used in 5G to increase a system capacity and coverage. In an initial access phase, because an optimal beam in which a user is located cannot be obtained, uplink PRACH detection and reception can be performed only by traversing all beams. However, this greatly increases an access latency of the user.

SUMMARY

Embodiments of this application provide a PRACH detection method and an apparatus. Beams are first grouped, and a cell is covered by using a plurality of groups of beams. When user equipment is ready to perform access, a quantity of detected beams is effectively reduced based on different beams covered in different groups, thereby reducing an access latency of the user equipment and reducing processing complexity.

According to a first aspect, a PRACH detection method is provided, and the method includes: sequentially detecting frequency domain data of each beam in at least two groups of beams; obtaining frequency domain data of a frequency corresponding to a PRACH from frequency domain data of a currently detected beam; determining a time domain correlation peak of the PRACH based on the frequency domain data of the frequency corresponding to the PRACH; determining a first peak value based on the time domain correlation peak of the PRACH, where the first peak value is a highest peak value in the time domain correlation peak of the PRACH; and when the first peak value is greater than or equal to a first threshold, sending a random access response message to user equipment, where the random access response message is used to establish a connection between the user equipment and a base station.

In a possible implementation, before the sequentially detecting frequency domain data of each beam in at least two groups of beams, the method further includes: determining the at least two groups of beams, where each group of beams includes at least one beam.

In a possible implementation, the method further includes: determining a beam detection sequence; and the sequentially detecting frequency domain data of each beam in at least two groups of beams includes: sequentially detecting the frequency domain data of each beam in the at least two groups of beams according to the detection sequence.

In a possible implementation, the determining a beam detection sequence includes: determining a user distribution quantity of each beam in the at least two groups of beams based on historical data; and sorting all beams in the at least two groups of beams in descending order based on the user distribution quantity, to obtain the detection sequence.

In a possible implementation, the method further includes: when a first peak value of each beam in the at least two groups of beams is less than the first threshold, and first peak values of at least two beams in the at least two groups of beams are greater than or equal to a second threshold, performing incoherent combination on time domain correlation peaks of the at least two beams whose first peak values are greater than or equal to the second threshold; determining a second peak value based on a time domain correlation peak obtained after the incoherent combination, where the second peak value is a highest peak value in the time domain correlation peak obtained after the incoherent combination; and when the second peak value is greater than or equal to the first threshold, sending the random access response message to the user equipment, where the random access response message is used to establish the connection between the user equipment and the base station.

In a possible implementation, the detecting frequency domain data of each beam in at least two groups of beams includes: obtaining time domain data of a plurality of antennas; transforming the time domain data of the plurality of antennas into frequency domain data through first transform; and weighting the frequency domain data of the plurality of antennas by using a first transform weighted value, to obtain the frequency domain data of each beam in the at least two groups of beams.

In a possible implementation, the determining a time domain correlation peak of the PRACH based on the frequency domain data of the frequency corresponding to the PRACH includes: performing correlation calculation on the frequency domain data of the frequency corresponding to the PRACH and a locally stored sequence; and transforming, to a time domain through second transform, the frequency domain data that is of the frequency corresponding to the PRACH and that is obtained after the correlation calculation, to obtain the time domain correlation peak of the PRACH.

In a possible implementation, the correlation calculation includes: conjugate dot product calculation.

In a possible implementation, the method further includes: when the first peak value or the second peak value is greater than or equal to the first threshold, determining a time point corresponding to the first peak value or the second peak value, and calculating an initial maximum timing advance based on the time point.

According to a second aspect, a PRACH detection apparatus is provided, including: a detection module, sequentially detecting frequency domain data of each beam in at least two groups of beams; an obtaining module, obtaining frequency domain data of a frequency corresponding to a PRACH from frequency domain data of a currently detected beam; determining a time domain correlation peak of the PRACH based on the frequency domain data of the frequency corresponding to the PRACH; and determining a first peak value based on the time domain correlation peak of the PRACH, where the first peak value is a highest peak value in the time domain correlation peak of the PRACH; and a determining module, when the first peak value is greater than or equal to a first threshold, sending a random access response message to user equipment, where the random access response message is used to establish a connection between the user equipment and a base station.

In a possible implementation, the detection module further includes: determining the at least two groups of beams, where each group of beams includes at least one beam.

In a possible implementation, the detection module further includes: determining a beam detection sequence; and the detection module includes: sequentially detecting the frequency domain data of each beam in the at least two groups of beams according to the detection sequence.

In a possible implementation, the determining a beam detection sequence includes: determining a user distribution quantity of each beam in the at least two groups of beams based on historical data; and sorting all beams in the at least two groups of beams in descending order based on the user distribution quantity, to obtain the detection sequence.

In a possible implementation, the determining module further includes: when a first peak value of each beam in the at least two groups of beams is less than the first threshold, and first peak values of at least two beams in the at least two groups of beams are greater than or equal to a second threshold, performing incoherent combination on time domain correlation peaks of the at least two beams whose first peak values are greater than or equal to the second threshold; determining a second peak value based on a time domain correlation peak obtained after the incoherent combination, where the second peak value is a highest peak value in the time domain correlation peak obtained after the incoherent combination; and when the second peak value is greater than or equal to the first threshold, sending the random access response message to the user equipment, where the random access response message is used to establish the connection between the user equipment and the base station.

In a possible implementation, the detection module includes: obtaining time domain data of a plurality of antennas; transforming the time domain data of the plurality of antennas into frequency domain data through first transform; and weighting the frequency domain data of the plurality of antennas by using a first transform weighted value, to obtain the frequency domain data of each beam in the at least two groups of beams.

In a possible implementation, the obtaining module includes: performing correlation calculation on the frequency domain data of the frequency corresponding to the PRACH and a locally stored sequence; and transforming, to a time domain through second transform, the frequency domain data that is of the frequency corresponding to the PRACH and that is obtained after the correlation calculation, to obtain the time domain correlation peak of the PRACH.

In a possible implementation, the correlation calculation includes: conjugate dot product calculation.

In a possible implementation, the determining module further includes: when the first peak value or the second peak value is greater than or equal to the first threshold, determining a time point corresponding to the first peak value or the second peak value, and calculating an initial maximum timing advance based on the time point.

According to a third aspect, a communications apparatus is provided. The communications apparatus may be a base station or a chip in a base station. The communications apparatus includes a processor, and the processor is coupled to a memory. The memory is configured to store a computer program or instructions. The processor is configured to read and execute the computer program or the instructions in the memory, so that the communications apparatus performs the method according to the first aspect. Optionally, the communications apparatus further includes the memory.

According to a fourth aspect, a computer-readable storage medium storing a program is provided. The program includes instructions, and when the instructions are executed by a computer, the computer is enabled to perform the method according to the first aspect.

According to a fifth aspect, a computer program product including instructions is provided, and when the computer program product runs, the method according to the first aspect is performed.

This application discloses the PRACH detection method and the apparatus. The beams are first grouped, and the cell is covered by using the plurality of groups of beams. By using different beams selected for different groups, when the user equipment performs access, the quantity of detected beams can be effectively reduced, and the access latency can also be reduced. In addition, after to-be-scanned beams are sorted, a beam with a high usage rate may be preferentially scanned based on an access status of the user equipment, so that the user equipment can more quickly perform access, thereby further reducing the access latency and reducing the processing complexity.

DESCRIPTION OF EMBODIMENTS

The following describes the technical solutions in embodiments of this application with reference to the accompanying drawings in the embodiments of this application.

Figure 1:
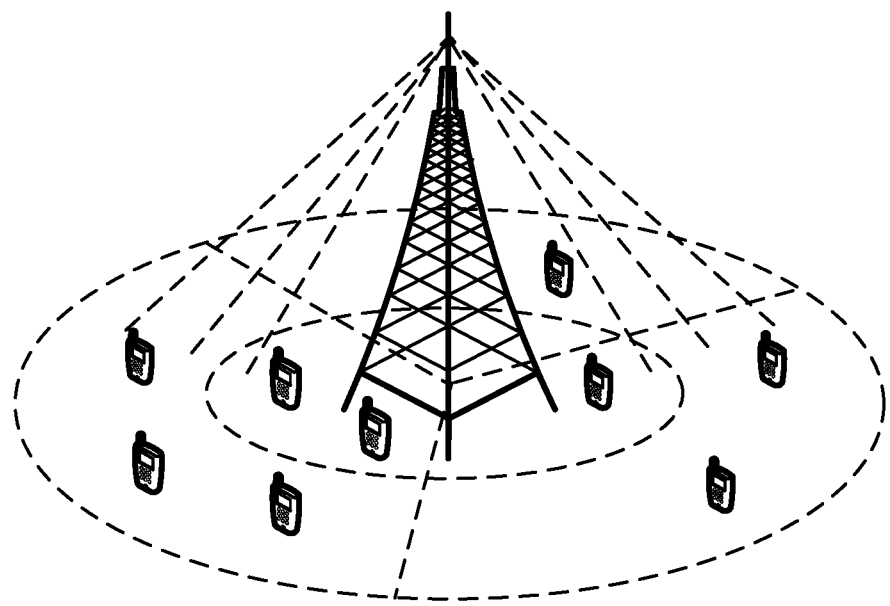
FIG. 1 is a schematic diagram of a PRACH detection application scenario according to an embodiment of this application.

This application is applied to a network function virtualization system. As shown in FIG. 1, FIG. 1 is a schematic diagram of a PRACH detection application scenario according to an embodiment of this application.

As shown in FIG. 1, the scenario includes at least one base station and a plurality of UEs. The base station divides a coverage area in a 360° range into three cells by 120°. For each cell, the base station generates a directional beam by adjusting a weighted coefficient of each antenna in an antenna array of the base station. In this scenario, the UE is located around the base station, and communication is established between the base station and the UE by using a beam. Before the UE establishes a connection to the base station, the UE accesses the base station in a random access manner, and the base station determines, by detecting a preamble sent by the UE, whether there is the UE to perform access and specific UE that currently requests to perform access. A person skilled in the art should note that the manner of division into the cell by 120° shown in FIG. 1 is merely a possible implementation, and a cell range may be further obtained through division by another angle based on an actual requirement. This is not limited herein in this application. A person skilled in the art should further note that one of the cells is used as an example for description in this application.

A massive MIMO technology is commonly used in 5G wireless communications systems. On a massive MIMO base station side, PRACH detection is to detect each beam, then finally select to perform correlation calculation with a local sequence, and select a beam with a strongest peak value as a detection result. This application provides a PRACH detection method. Time domain data of a plurality of antennas is first received, and then the time domain data of the plurality of antennas is transformed into frequency domain data. The foregoing transform may be discrete Fourier transform (DFT), or may be any other equivalent transform. In this application, the DFT is used as an example to describe the solution in more detail. The frequency domain data of the plurality of antennas is weighted by using a DFT weighted value, to obtain frequency domain data of a plurality of beams. A person skilled in the art should note that a quantity of the plurality of antennas may be the same as or different from a quantity of the plurality of beams. Currently, in the industry, the DFT weighted value is commonly used to process and weight the received time domain data of the antennas, to obtain the frequency domain data of the beams. Then, each beam is separately detected, and a beam with a strongest detected peak value is selected as a final detection result based on a detection result of each beam.

However, in a current massive MIMO PRACH detection solution, detection is performed in a beam domain to obtain gains of a plurality of antennas. If a plurality of narrow beams are used to cover an entire cell, a relatively large quantity of beams are required. In this case, the PRACH detection has relatively high processing complexity and a long latency. This severely affects an access latency of the user equipment. If a wide beam is used to cover the entire cell, a beam gain in an access phase decreases, and PRACH detection performance deteriorates. Consequently, the access of the user equipment and beam coverage performance are affected. Therefore, an embodiment of this application provides a PRACH detection method.

In this embodiment of this application, PRACH detection and scanning are performed based on grouped beams, and a plurality of groups of beams are used to cover an entire cell. A group located relatively near a base station may use a wide beam for coverage, to reduce a quantity of beams and reduce processing complexity. A slightly farther group may use narrow beams for coverage, to obtain a beam gain. In this application, a beam detection sequence may be further determined based on a pre-statistical user distribution quantity of user distribution. After a preamble sequence is detected, a random access response (RAR) is immediately sent, so that an average access latency of users in the cell can be shorter. In addition, when no preamble sequence is detected for all beams, if there are peak values of a plurality of beams exceeding a threshold, the plurality of beams may be used for joint detection, thereby further improving PRACH detection performance.

The following describes the technical solutions in the embodiments of this application with reference to the accompanying drawings in the embodiments of this application.

Figure 2:
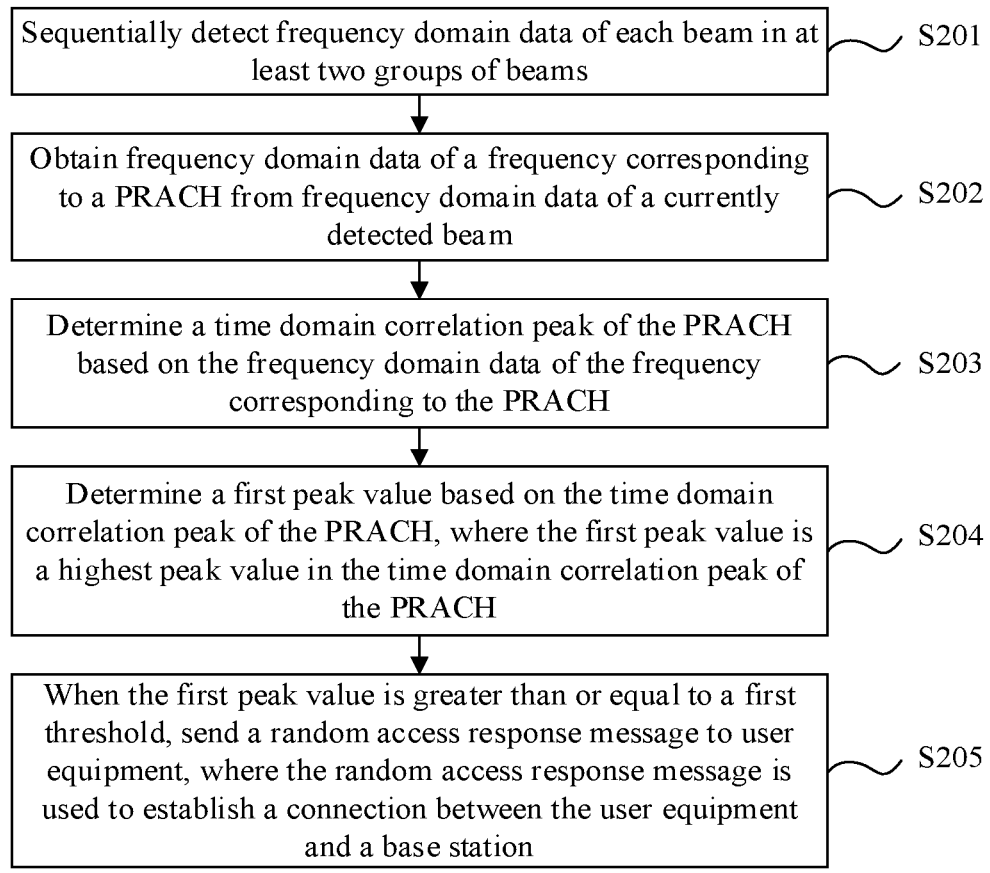
FIG. 2 is a flowchart of a PRACH detection method according to an embodiment of this application.

FIG. 2 is a flowchart of a PRACH detection method according to an embodiment of this application. The method provided in this embodiment may be performed by an access network device or a chip in an access network device.

As shown in FIG. 2, this embodiment of this application provides the PRACH detection method. The method includes the following steps.

S201: Sequentially detect frequency domain data of each beam in at least two groups of beams.

Each beam in the at least two groups of beams is detected one by one. Time domain data of a plurality of antennas is first received, and then the time domain data of the plurality of antennas is transformed into frequency domain data. The foregoing transform may be DFT, or may be any other equivalent transform. In this embodiment of this application, the DFT is used as an example to describe the solution in more detail. The frequency domain data of the plurality of antennas is weighted by using a DFT weighted value, to obtain frequency domain data of a currently detected beam.

In an embodiment, a quantity of groups of beams covering a cell, a quantity of beams included in each group, a coverage angle of each beam, and a total quantity of beams for PRACH detection of the cell may be determined based on a processing capability of a base station and a coverage area required by the cell. The quantity of groups of the beams covering the cell may be determined based on the processing capability of the base station and the coverage area required by the cell. In an example, a beam detection effect of the base station is good within 200 meters from the base station, a beam detected by the base station is relatively good within 200 meters to 500 meters, and a beam detected beyond 500 meters gradually weakens. In this case, the beams covering the cell may be divided into three groups, which are respectively used to cover an area within 200 meters, an area within 200 meters to 500 meters, and an area beyond 500 meters. The coverage angle of each beam is determined based on the processing capability of the base station and the coverage area required by the cell. In other words, whether each beam is a wide beam or a narrow beam is determined. In an example, there may be two groups of beams for cell coverage. A first group includes two wide beams, and a second group includes four narrow beams. In another example, there may be three groups of beams for cell coverage. A first group includes two wide beams, a second group includes four narrow beams, and a third group includes eight narrow beams. A person skilled in the art should note that all beams included in each group may be narrow beams, or may be wide beams, or may be both narrow beams and wide beams. Any one of the foregoing cases may be selected based on an actual situation. This is not limited herein in this application.

In a current coverage solution that is commonly used, if a plurality of narrow beams are used to cover an entire cell, high processing complexity and a long latency are caused, and an access latency of user equipment is affected, resulting in extremely poor access experience. If a wide beam is used to cover an entire cell, a beam gain decreases and demodulation performance deteriorates. As a result, coverage performance of the beam is affected. Compared with the current coverage solution, in this application, the narrow beans are used for coverage at a long distance to ensure a gain, and for a short distance, the wide beam may be used for coverage to reduce a coverage beam, thereby reducing processing complexity, so that the user equipment can more quickly perform access, and the access latency is reduced.

S202: Obtain frequency domain data of a frequency corresponding to a PRACH from the frequency domain data of the currently detected beam.

The frequency domain data of the frequency corresponding to the PRACH is obtained from the frequency domain data of the currently detected beam. In an embodiment, the frequency domain data of the frequency corresponding to the PRACH may be a preamble.

S203: Determine a time domain correlation peak of the PRACH based on the frequency domain data of the frequency corresponding to the PRACH.

Correlation calculation is performed on the frequency domain data of the frequency corresponding to the PRACH and a locally stored sequence. In an embodiment, conjugate dot product may be used for the correlation calculation. The conjugate dot product is performed on the preamble and the locally stored sequence. Then, data obtained after the conjugate dot product is transformed to a time domain through second transform, to obtain the time domain correlation peak of the PRACH. The time domain correlation peak of the PRACH may include a plurality of peak values. In an embodiment, the second transform may be inverse fast Fourier transform (IFFT). A person skilled in the art should note that the second transform may alternatively be any equivalent transform manner.

S204: Determine a first peak value based on the time domain correlation peak of the PRACH, where the first peak value is a highest peak value in the time domain correlation peak of the PRACH.

The highest peak value is selected as the first peak value from the plurality of peak values of the time domain correlation peak, of the PRACH, obtained after the transform.

S205: When the first peak value is greater than or equal to a first threshold, send a random access response message to the user equipment, where the random access response message is used to establish a connection between the user equipment and the base station.

Whether a first peak value of the currently detected beam is greater than the first threshold is determined. If the first peak value of the currently detected beam is greater than the first threshold, it indicates that the preamble is strongly correlated with the locally stored sequence, and it may be considered that the user equipment may perform access on the currently detected beam, and a final detection result is reported to higher layer software.

In this application, the beams are first grouped, and the cell is covered by using a plurality of groups of beams. By using different beams selected for different groups, when the user equipment performs access, a quantity of detected beams is effectively reduced, and the access latency of the user equipment can also be reduced.

Figure 3:
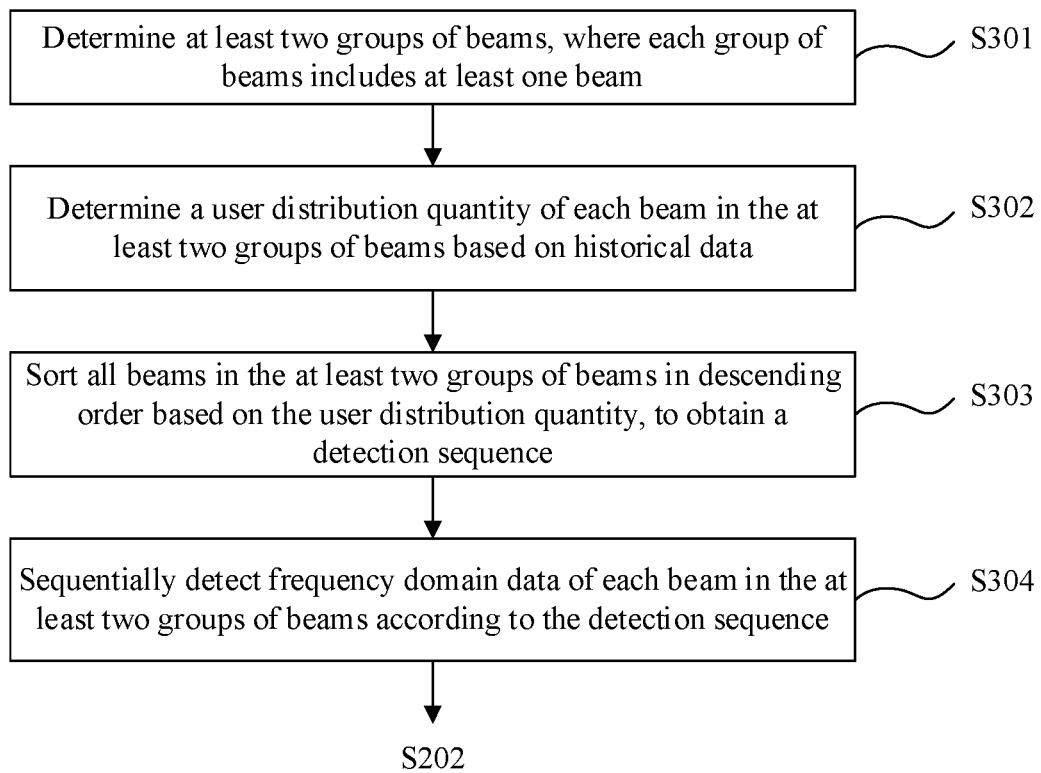
FIG. 3 is a flowchart of another PRACH detection method according to an embodiment of this application.

FIG. 3 is a flowchart of another PRACH detection method according to an embodiment of this application.

Based on the solution shown in FIG. 2, this application further provides the other PRACH detection method. As shown in FIG. 3, the method includes the following steps.

S301: Determine at least two groups of beams, where each group of beams includes at least one beam.

First, a coverage solution required for current cell coverage is determined. To be specific, a quantity of groups of beams covering a cell, a quantity of beams included in each group, a coverage angle of each beam, and a total quantity of beams for PRACH detection of the cell are determined.

S302: Determine a user distribution quantity of each beam in the at least two groups of beams based on historical data.

The user distribution quantity of each beam in the cell may be determined based on the historical data within a past period of time. In other words, in each beam, a quantity of user equipments performing access by using the beam is determined.

S303: Sort all beams in the at least two groups of beams in descending order based on the user distribution quantity, to obtain the detection sequence.

All the beams are sorted in descending order based on the user distribution quantity of each beam. A first-ranked beam has a maximum quantity of user equipments performing access, and user distribution quantities in the beams gradually decreases according to an arrangement sequence.

S304: Sequentially detect frequency domain data of each beam in the at least two groups of beams according to the detection sequence.

Then, all beams covering the cell are detected according to the detection sequence. A larger user distribution quantity in a beam indicates a higher detection priority. In an embodiment, all the beams in the cell are detected according to the sequence. After a preamble sequence is detected for one of the beams, for a subsequently undetected beam, detection may be stopped, thereby reducing subsequent beam processing complexity.

Priority sorting is performed on all the beams in the cell, and a beam having a large user distribution quantity is preferentially detected, so that the user equipment can more quickly perform access, thereby reducing the processing complexity and reducing an access latency.

Figure 4:
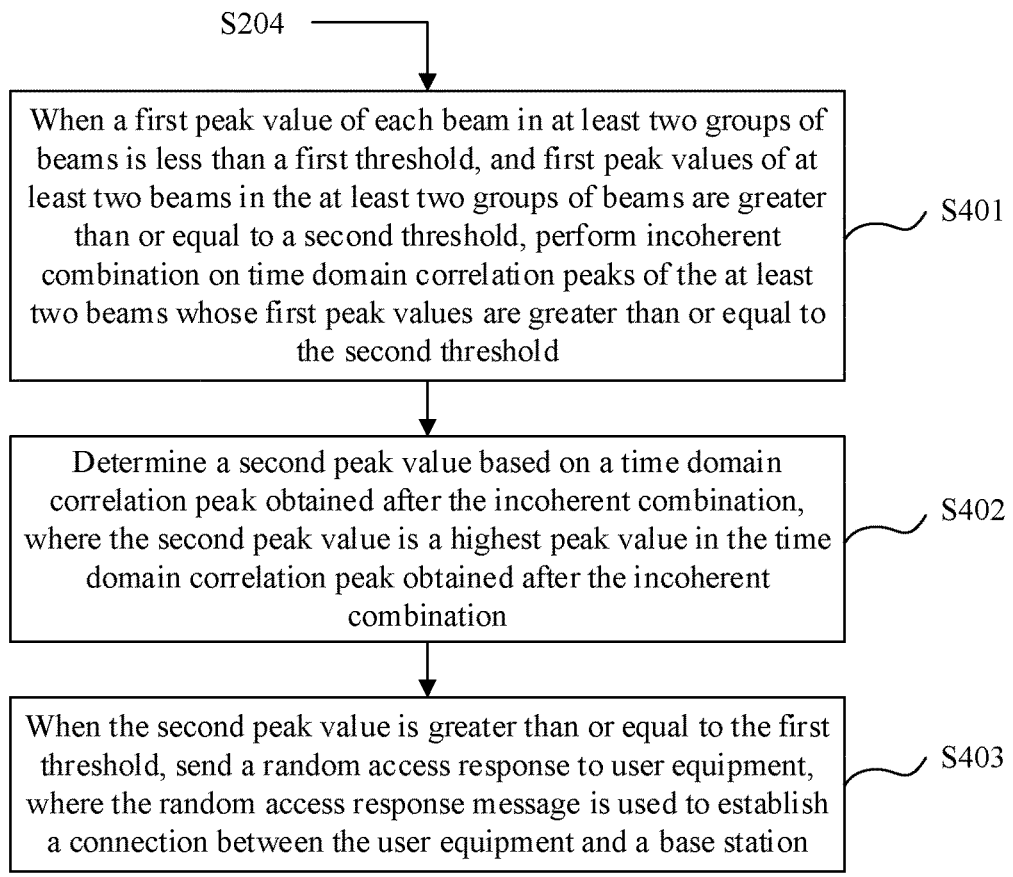
FIG. 4 is a flowchart of still another PRACH detection method according to an embodiment of this application.

FIG. 4 is a flowchart of still another PRACH detection method according to an embodiment of this application.

As shown in FIG. 4, this application further provides the still another PRACH detection method. After S204 in FIG. 2, the method includes the following steps.

S401: When a first peak value of each beam in at least two groups of beams is less than a first threshold, and first peak values of at least two beams in the at least two groups of beams are greater than or equal to a second threshold, perform incoherent combination on time domain correlation peaks of the at least two beams whose first peak values are greater than or equal to the second threshold.

When first peak values of all beams in a cell are less than the first threshold, the first peak values of all the beams in the cell may be compared with the second threshold. If first peak values of two or more beams are greater than or equal to the second threshold, incoherent combination is performed on time domain correlation peaks of the two or more beams whose first peak values exceed the second threshold. A time domain correlation peak obtained after the incoherent combination is compared with the first threshold again.

When first peak values of two or more beams are greater than or equal to the second threshold, it may be considered that a current user equipment signal is relatively weak, and cannot be detected by using a single beam. However, the current user equipment signal may be jointly detected by using a plurality of beams, thereby further improving PRACH detection performance.

S402: Determine a second peak value based on the time domain correlation peak obtained after the incoherent combination, where the second peak value is a highest peak value in the time domain correlation peak obtained after the incoherent combination.

The highest peak value is selected as the second peak value from a plurality of peak values of the time domain correlation peak obtained after the incoherent combination.

S403: When the second peak value is greater than or equal to the first threshold, send a random access response to user equipment, where the random access response message is used to establish a connection between the user equipment and a base station.

In this case, when the second peak value is greater than or equal to the first threshold, it is considered that a preamble sent by the user equipment is jointly detected by using the plurality of beams, and the preamble is strongly correlated with a locally stored sequence. A detection result is finally reported to higher layer software, and the random access response is sent to the user equipment.

Incoherent combination is performed on two or more beams and then detection is performed, so that a problem that the user equipment cannot be detected by using a single beam is effectively suppressed, and the PRACH detection performance is further improved.

In an embodiment, the following steps may be further included: searching for a peak value in each search interval based on each beam, then determining a latency based on a location of a peak value point, and calculating an initial maximum timing advance (time advance, TA) value. Then, the random access response message is sent to the user equipment, where the random access response message includes an initial maximum timing advance, and the random access response message is used to establish the connection between the user equipment and the base station. The initial TA value is used to subsequently send information in advance of a TA time after the user equipment establishes the connection to the base station, to ensure time synchronization during the connection.

A person skilled in the art should note that, the "first" and the "second" in the "first peak value" and the "second peak value" mentioned in this application are merely intended to distinguish a highest peak value in two different time domain correlation peaks, and there is no limitation on a sequence between the two peak values.

Figure 5:
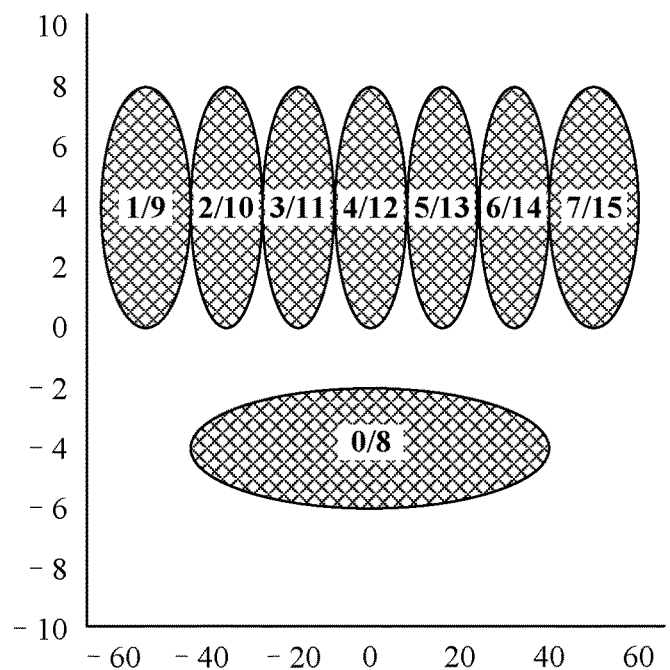
FIG. 5 is a schematic diagram of beam coverage according to an embodiment of this application.

FIG. 5 is a schematic diagram of beam coverage according to an embodiment of this application.

The following describes the method mentioned in this application with reference to a more specific embodiment.

As shown in FIG. 5, in this embodiment, a 64 transceiver (transceiver, TRX) is used as an example to describe a PRACH detection method based on grouped beam scanning.

The 64 TRX includes 64 radio frequency channels, and it may be considered that time domain data of 64 antennas is received.

First, grouped beams for PRACH detection in a cell are determined based on a cell coverage scenario. In an embodiment, the scenario may be, for example, a scenario in which a cell coverage area is required to be horizontal 120° and vertical 12°. In an example, a design scheme of two vertical beams and 7+1 horizontal beams may be used. A location of a horizontal-axis coordinate 0 in FIG. 5 is a location of a base station. A direction from near to far from the location of the base station is a vertical direction, and a direction from left to right parallel to the location of the base station is a horizontal direction. One wide beam is used for coverage in the horizontal direction at a location near the base station, that is, a beam from −40° to 40° for horizontal coverage in a lower part of FIG. 5. Seven narrow beams are used for coverage in the horizontal direction at a location relatively far away from the base station, that is, seven narrow beams in an upper part of FIG. 5. Each beam includes both a left polarized beam and a right polarized beam for coverage, and is used to receive signals in all directions on the area. In an example, different polarized beams may be numbered. For example, numbers of left polarized beams are respectively 0 to 7, and numbers of right polarized beams are respectively 8 to 15.

Before detecting a beam, the base station sets a user quantity indication identifier for each beam. After user equipment performs access, a reference signal received power (reference signal receiving power, RSRP) value of each beam may be counted. Then, for a beam whose RSRP value exceeds a preset PSRP threshold, the user quantity indication identifier is increased by 1. Then, statistics about user distribution quantities of all beams in the cell within a past period of time are counted, and priority sorting is performed based on a value of the user distribution quantity, to determine a beam scanning sequence of the PRACH detection.

The base station obtains the time domain data of the 64 antennas, and obtains frequency domain signals of the 64 antennas through DFT transform. Based on a determined grouped beam solution, the frequency domain signals of the antennas are weighted to obtain frequency domain signals corresponding to 16 beams. Each polarization has eight beams.

The beams in the cell are sequentially detected according to a predetermined beam scanning sequence. Frequency domain data of a frequency corresponding to a PRACH of a currently detected beam is extracted to perform conjugate dot product with a locally stored root sequence. Then, IFFT transform is performed to transform, to a time domain, a result of performing the conjugate dot product on the frequency domain data and the local sequence. A peak value is searched for in each search interval of the time domain. If a location of a peak value point exceeds a first detection threshold Thr1, it may be considered that preamble detection is successful. In addition, a latency may be determined based on the location of the peak value, and an initial TA value may be calculated. After the preamble detection is successful, an RAR is immediately sent, thereby reducing an access latency of a user. In addition, a remaining undetected beam is no longer detected subsequently, thereby reducing subsequent beam processing complexity. Immediately sending the RAR means that a base station side sends a message 2 (Msg2) to notify a UE side to perform a subsequent procedure.

If peak values of all beams in a current cell do not exceed Thr1 after traversing, no preamble is detected for a single beam. In this case, whether a peak value of each beam in the current cell exceeds a second threshold Thr2 is determined. If there are two or more beams whose peak values exceed Thr2, incoherent combination is performed on the two or more beams whose peak values exceed Thr2, and then the PRACH detection is performed again, thereby further improving PRACH detection performance.

In this application, PRACH processing complexity and detection performance can be well balanced. In a grouped beam scanning solution, the wide beam is used for coverage at a near point, to reduce a quantity of detected beams and reduce the processing complexity. The narrow beams are used for coverage at a far point, to obtain a higher beam gain and improve the PRACH detection performance. In addition, in this application, a PRACH beam detection sequence is further determined by counting statistics about user distribution of different beams in the cell. In this way, an average access latency of users in the cell can be reduced. When no preamble is detected for a single beam, in this application, whether the peak value of each beam exceeds the second threshold is finally determined, and all time domain correlation peaks of the beams exceeding the second threshold are detected again after the incoherent combination, to improve the PRACH detection performance.

A person skilled in the art should note that the first threshold and the second threshold in this application may be randomly set according to an actual situation, and may be any integer, any ratio or percentage value, or any decimal fraction. This is not limited herein in this application.

Figure 6:
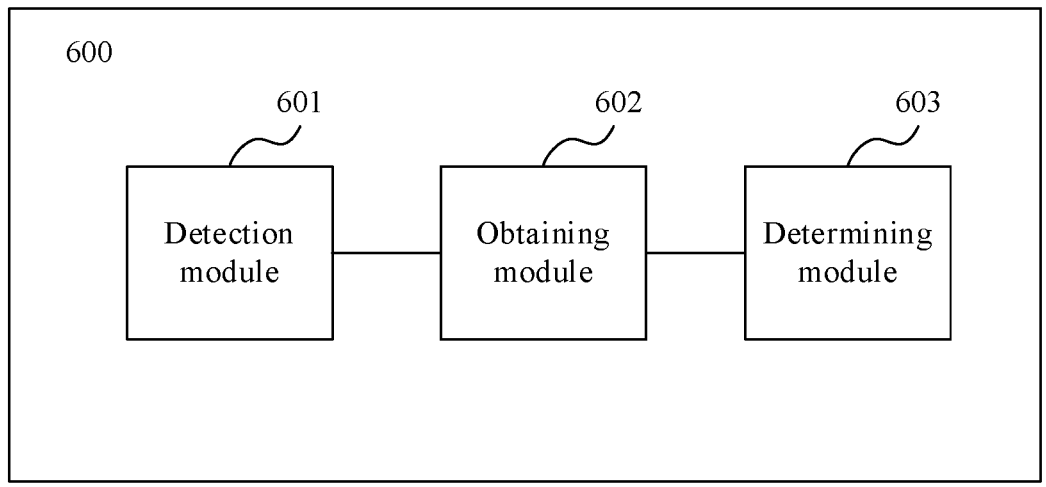
FIG. 6 is a schematic diagram of a PRACH detection apparatus according to an embodiment of this application.

FIG. 6 is a schematic diagram of a PRACH detection apparatus according to an embodiment of this application.

As shown in FIG. 6, this application provides a PRACH detection apparatus 600, including: a detection module 601, sequentially detecting frequency domain data of each beam in at least two groups of beams; an obtaining module 602, obtaining frequency domain data of a frequency corresponding to a PRACH from frequency domain data of a currently detected beam; determining a time domain correlation peak of the PRACH based on the frequency domain data of the frequency corresponding to the PRACH; and determining a first peak value based on the time domain correlation peak of the PRACH, where the first peak value is a highest peak value in the time domain correlation peak of the PRACH; and a determining module 603, when the first peak value is greater than or equal to a first threshold, sending a random access response message to user equipment, where the random access response message is used to establish a connection between the user equipment and a base station.

In a possible implementation, the detection module 601 further includes: determining the at least two groups of beams, where each group of beams includes at least one beam.

In a possible implementation, the detection module 601 further includes: determining a beam detection sequence; and the detection module 601 includes: sequentially detecting the frequency domain data of each beam in the at least two groups of beams according to the detection sequence.

In a possible implementation, the determining a beam detection sequence includes: determining a user distribution quantity of each beam in the at least two groups of beams based on historical data; and sorting all beams in the at least two groups of beams in descending order based on the user distribution quantity, to obtain the detection sequence.

In a possible implementation, the determining module 603 further includes: when a first peak value of each beam in the at least two groups of beams is less than the first threshold, and first peak values of at least two beams in the at least two groups of beams are greater than or equal to a second threshold, performing incoherent combination on time domain correlation peaks of the at least two beams whose first peak values are greater than or equal to the second threshold; determining a second peak value based on a time domain correlation peak obtained after the incoherent combination, where the second peak value is a highest peak value in the time domain correlation peak obtained after the incoherent combination; and when the second peak value is greater than or equal to the first threshold, sending the random access response message to the user equipment, where the random access response message is used to establish the connection between the user equipment and the base station.

In a possible implementation, the detection module 601 includes: obtaining time domain data of a plurality of antennas; transforming the time domain data of the plurality of antennas into frequency domain data through first transform; and weighting the frequency domain data of the plurality of antennas by using a first transform weighted value, to obtain the frequency domain data of each beam in the at least two groups of beams.

In a possible implementation, the obtaining module 602 includes: performing correlation calculation on the frequency domain data of the frequency corresponding to the PRACH and a locally stored sequence; and transforming, to a time domain through second transform, the frequency domain data that is of the frequency corresponding to the PRACH and that is obtained after the correlation calculation, to obtain the time domain correlation peak of the PRACH.

In a possible implementation, the correlation calculation includes: conjugate dot product calculation.

In a possible implementation, the determining module 603 further includes: when the first peak value or the second peak value is greater than or equal to the first threshold, determining a time point corresponding to the first peak value or the second peak value, and calculating an initial maximum timing advance based on the time point.

In this application, PRACH processing complexity and detection performance can be well balanced. In a grouped beam scanning solution, a wide beam is used for coverage at a near point, to reduce a quantity of detected beams and reduce the processing complexity. Narrow beams are used for coverage at a far point, to obtain a higher beam gain and improve the PRACH detection performance. In addition, in this application, a PRACH beam detection sequence is further determined by counting statistics about user distribution of different beams in a cell. In this way, an average access latency of users in the cell can be reduced. When no preamble is detected for a single beam, in this application, whether the first peak value of each beam exceeds the second threshold is finally determined, and all time domain correlation peaks of the beams exceeding the second threshold are detected again after the incoherent combination, to improve the PRACH detection performance.

Figure 7:
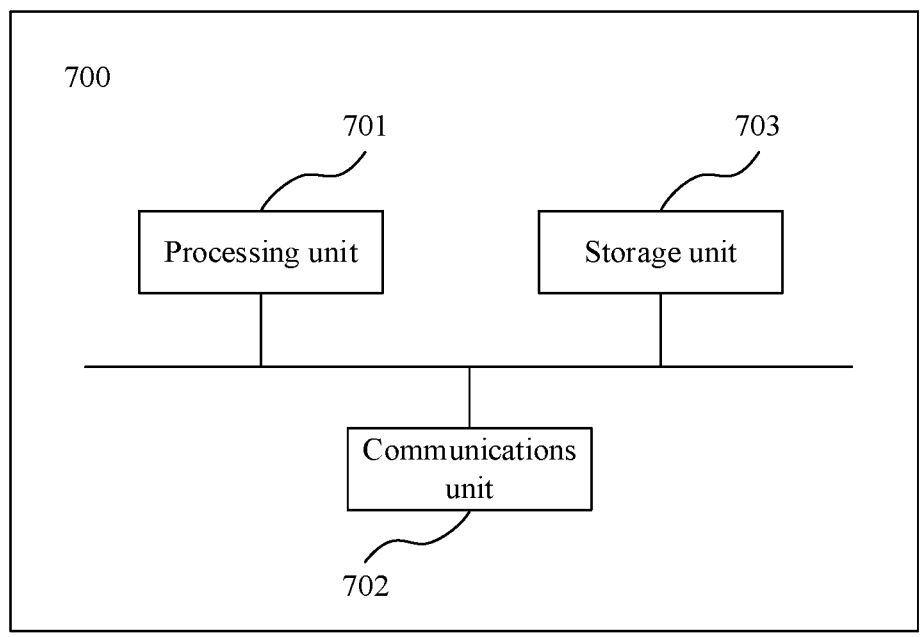
FIG. 7 is a schematic diagram of a communications apparatus according to an embodiment of this application.

FIG. 7 is a schematic diagram of a communications apparatus according to an embodiment of this application.

As shown in FIG. 7, this application further provides a communications apparatus 700. The communications apparatus 700 includes a processing unit 701 and a communications unit 702. Optionally, the communications apparatus 700 further includes a storage unit 703. The processing unit 701, the communications unit 702, and the storage unit 703 are connected by using a communications bus.

The processing unit 701 may be a unit having a processing function, and is configured to control the communications apparatus 700 to perform a method or an action. The processing unit 701 may include one or more processors.

The storage unit 703 may be a unit having a storage function. For example, the storage unit 703 may include one or more memories, and the memory may be a component that is in one or more devices or circuits and that is configured to store a program or data.

The storage unit 703 may exist independently, and is connected to the processing unit 701 by using the communications bus. The storage unit may alternatively be integrated together with the processing unit 701.

The communications unit 702 may be a unit having a transceiver function, and is configured to communicate with another communications device.

The communications apparatus 700 may be used in a communications device, a circuit, a hardware component, or a chip.

The communications apparatus 700 may be the base station in the embodiments of this application, for example, the apparatus 600. A schematic diagram of the apparatus 600 may be shown in FIG. 6. Optionally, the communications unit 702 of the communications apparatus 700 may include an antenna and a transceiver. Optionally, the communications unit 702 of the communications apparatus 700 may include a network interface.

The communications apparatus 700 may be a chip in the base station in the embodiments of this application, for example, the apparatus 600. The schematic diagram of the apparatus 600 may be shown in FIG. 6. The communications unit 702 may be an input/output interface, a pin, a circuit, or the like. Optionally, the storage unit 703 may store computer-executable instructions of a method on an access network device side, so that the processing unit 701 performs the method of the access network device 600 in the foregoing embodiments. The storage unit 703 may be a register, a cache, a RAM, or the like, and the storage unit 703 may be integrated together with the processing unit 701. The storage unit 703 may be a ROM or another type of static storage device that can store static information and instructions, and the storage unit 703 may be independent of the processing unit 701. Optionally, with the development of wireless communications technologies, the transceiver may be integrated into the communications apparatus 700.

When the communications apparatus 700 may be the base station or the chip in the base station in the embodiments of this application, the communications apparatus 700 may perform a method performed by the base station, for example, the method performed by the apparatus 600.

For example, the processing unit 701 may sequentially detect frequency domain data of each beam in at least two groups of beams; obtain frequency domain data of a frequency corresponding to a PRACH from frequency domain data of a currently detected beam; determine a time domain correlation peak of the PRACH based on the frequency domain data of the frequency corresponding to the PRACH; determine a first peak value based on the time domain correlation peak of the PRACH, where the first peak value is a highest peak value in the time domain correlation peak of the PRACH; and when the first peak value is greater than or equal to a first threshold, send a random access response message to user equipment, where the random access response message is used to establish a connection between the user equipment and a base station.

In a possible implementation, the processing unit 701 may further determine the at least two groups of beams, where each group of beams includes at least one beam.

In a possible implementation, the storage unit 703 may determine a beam detection sequence; and the processing unit 701 includes: sequentially detecting the frequency domain data of each beam in the at least two groups of beams according to the detection sequence.

In a possible implementation, the determining a beam detection sequence includes: determining a user distribution quantity of each beam in the at least two groups of beams based on historical data; and sorting all beams in the at least two groups of beams in descending order based on the user distribution quantity, to obtain the detection sequence.

In a possible implementation, the processing unit 701 may further perform incoherent combination on time domain correlation peaks of at least two beams whose first peak values are greater than or equal to a second threshold when a first peak value of each beam in the at least two groups of beams is less than the first threshold, and the first peak values of the at least two beams in the at least two groups of beams are greater than or equal to the second threshold; determine a second peak value based on a time domain correlation peak obtained after the incoherent combination, where the second peak value is a highest peak value in the time domain correlation peak obtained after the incoherent combination; and when the second peak value is greater than or equal to the first threshold, send the random access response message to the user equipment, where the random access response message is used to establish the connection between the user equipment and the base station.

In a possible implementation, the processing unit 701 may further obtain time domain data of a plurality of antennas; transform the time domain data of the plurality of antennas into frequency domain data through first transform; and weight the frequency domain data of the plurality of antennas by using a first transform weighted value, to obtain the frequency domain data of each beam in the at least two groups of beams.

In a possible implementation, the processing unit 701 may further perform correlation calculation on the frequency domain data of the frequency corresponding to the PRACH and a locally stored sequence; and transform, to a time domain through second transform, the frequency domain data that is of the frequency corresponding to the PRACH and that is obtained after the correlation calculation, to obtain the time domain correlation peak of the PRACH.

In a possible implementation, the correlation calculation includes: conjugate dot product calculation.

In a possible implementation, when the first peak value or the second peak value is greater than or equal to the first threshold, the processing unit 701 may further determine a time point corresponding to the first peak value or the second peak value, and calculate an initial maximum timing advance based on the time point. Functions of the functional units in the communications apparatus in this embodiment of this application may be implemented through the steps performed by the apparatuses in the embodiments shown in FIG. 2 to FIG. 4. Therefore, a specific working process of the communications apparatus provided in this embodiment of the present application is not described herein again.

In this application, PRACH processing complexity and detection performance can be well balanced. In a grouped beam scanning solution, a wide beam is used for coverage at a near point, to reduce a quantity of detected beams and reduce the processing complexity. Narrow beams are used for coverage at a far point, to obtain a higher beam gain and improve the PRACH detection performance. In addition, in this application, a PRACH beam detection sequence is further determined by counting statistics about user distribution of different beams in a cell. In this way, an average access latency of users in the cell can be reduced. When no preamble is detected for a single beam, in this application, whether the peak value of each beam exceeds the second threshold is finally determined, and all time domain correlation peaks of the beams exceeding the second threshold are detected again after the incoherent combination, to improve the PRACH detection performance.

A person of ordinary skill in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or some of the steps in each of the foregoing methods of the embodiments may be implemented by a program instructing a processor. The program may be stored in a computer-readable storage medium. The storage medium is a non-transitory medium, for example, a random-access memory, a read-only memory, a flash memory, a hard disk, a solid-state drive, a magnetic tape, a floppy disk, an optical disc, or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. physical random access channel (PRACH) What is claimed is:

What is claimed is:

1. A physical random access channel (PRACH) detection method, comprising:
    determining a user distribution quantity of each beam in at least two groups of beams based on historical data;
    sorting all beams in the at least two groups of beams in descending order based on the user distribution quantity to obtain a beam detection sequence;
    sequentially detecting frequency domain data for each beam in the at least two groups of beams according to the beam detection sequence;
    obtaining frequency domain data of a frequency corresponding to a PRACH from frequency domain data of a beam of the at least two groups of beams;
    determining a time domain correlation peak of the PRACH based on the frequency domain data of the frequency corresponding to the PRACH;
    determining a first peak value based on the time domain correlation peak of the PRACH, wherein the first peak value is a highest peak value in the time domain correlation peak of the PRACH; and
    when the first peak value is greater than or equal to a first threshold, sending a random access response message to a user equipment, wherein the random access response message is used to establish a connection between the user equipment and a base station.

2. The method according to claim 1, wherein before sequentially detecting the frequency domain data of each beam in the at least two groups of beams, the method further comprises:
    determining the at least two groups of beams.

3. The method according to claim 1, wherein the method further comprises:
    when a first peak value of each beam in the at least two groups of beams is less than the first threshold, and first peak values of at least two beams in the at least two groups of beams are greater than or equal to a second threshold, performing an incoherent combination on time domain correlation peaks of the at least two beams whose first peak values are greater than or equal to the second threshold;
    determining a second peak value based on a time domain correlation peak obtained after the incoherent combination, wherein the second peak value is a highest peak value in the time domain correlation peak obtained after the incoherent combination; and
    when the second peak value is greater than or equal to the first threshold, sending the random access response message to the user equipment, wherein the random access response message is used to establish the connection between the user equipment and the base station.

4. The method according to claim 1, wherein detecting the frequency domain data of each beam in the at least two groups of beams comprises:
    obtaining time domain data of a plurality of antennas;
    transforming the time domain data of the plurality of antennas into frequency domain data through a first transform; and
    weighting the frequency domain data of the plurality of antennas by using a first transform weighted value, to obtain the frequency domain data of each beam in the at least two groups of beams.

5. The method according to claim 1, wherein determining the time domain correlation peak of the PRACH based on the frequency domain data of the frequency corresponding to the PRACH comprises:
    performing a correlation calculation on the frequency domain data of the frequency corresponding to the PRACH and a locally stored sequence; and
    transforming, to a time domain through a second transform, the frequency domain data of the frequency corresponding to the PRACH that is obtained after the correlation calculation, to obtain the time domain correlation peak of the PRACH.

6. The method according to claim 5, wherein performing the correlation calculation comprises performing a conjugate dot product calculation.

7. The method according to claim 3, wherein the method further comprises:
    when the first peak value or the second peak value is greater than or equal to the first threshold, determining a time point corresponding to the first peak value or the second peak value, and calculating an initial maximum timing advance based on the time point.

8. An apparatus for a base station, comprising:
    at least one processor; and
    a memory coupled to the at least one processor, the memory storing programming instructions for execution by the at least one processor, wherein the programming instructions instruct the at least one processor to:
determine a user distribution quantity of each beam in at least two groups of beams based on historical data;
sort all beams in the at least two groups of beams in descending order based on the user distribution quantity to obtain a beam detection sequence;
sequentially detect frequency domain data of each beam in the at least two groups of beams according to the beam detection sequence;
obtain frequency domain data of a frequency corresponding to a physical random access channel (PRACH) from frequency domain data of a beam of the at least two groups of beams;
determine a time domain correlation peak of the PRACH based on the frequency domain data of the frequency corresponding to the PRACH;
determine a first peak value based on the time domain correlation peak of the PRACH, wherein the first peak value is a highest peak value in the time domain correlation peak of the PRACH; and
when the first peak value is greater than or equal to a first threshold, send a random access response message to a user equipment, wherein the random access response message is used to establish a connection between the user equipment and a base station.

9. The apparatus according to claim 8, wherein the programming instructions further instruct the at least one processor, before sequentially detecting the frequency domain data of each beam in at least two groups of beams, to:
determine the at least two groups of beams.

10. The apparatus according to claim 8, wherein the programming instructions further instruct the at least one processor to:
when a first peak value of each beam in the at least two groups of beams is less than the first threshold, and first peak values of at least two beams in the at least two groups of beams are greater than or equal to a second threshold, perform an incoherent combination on time domain correlation peaks of the at least two beams whose first peak values are greater than or equal to the second threshold;
determine a second peak value based on a time domain correlation peak obtained after the incoherent combination, wherein the second peak value is a highest peak value in the time domain correlation peak obtained after the incoherent combination; and
when the second peak value is greater than or equal to the first threshold, send the random access response message to the user equipment, wherein the random access response message is used to establish the connection between the user equipment and the base station.

11. The apparatus according to claim 8, wherein the programming instructions instruct the at least one processor to detect the frequency domain data of each beam by to:
obtaining time domain data of a plurality of antennas;
transforming the time domain data of the plurality of antennas into frequency domain data through a first transform; and
weighting the frequency domain data of the plurality of antennas by using a first transform weighted value, to obtain the frequency domain data of each beam in the at least two groups of beams.

12. The apparatus according to claim 8, wherein the programming instructions instruct the at least one processor to determine the time domain correlation peak of the PRACH by:
performing a correlation calculation on the frequency domain data of the frequency corresponding to the PRACH and a locally stored sequence; and
transforming, to a time domain through a second transform, the frequency domain data of the frequency corresponding to the PRACH that is obtained after the correlation calculation, to obtain the time domain correlation peak of the PRACH.

13. The apparatus according to claim 12, wherein performing the correlation calculation comprises performing a conjugate dot product calculation.

14. The apparatus according to claim 10, wherein the programming instructions further instruct the at least one processor to:
when the first peak value or the second peak value is greater than or equal to the first threshold, determine a time point corresponding to the first peak value or the second peak value, and calculate an initial maximum timing advance based on the time point.

15. The method according to claim 1, wherein at least one of the at least two groups of beams includes two or more beams.

16. The apparatus according to claim 8, wherein at least one of the at least two groups of beams includes two or more beams.

* * * * *